(12) United States Patent
White, III (10) Patent No.: US 11,624,441 B2
(45) Date of Patent: Apr. 11, 2023

(54) REINFORCED BRUSH SEAL ASSEMBLY

(71) Applicant: RAYTHEON TECHNOLOGIES CORPORATION, Farmington, CT (US)

(72) Inventor: Robert A. White, III, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 26 days.

(21) Appl. No.: 17/245,715

(22) Filed: Apr. 30, 2021

(65) Prior Publication Data
US 2022/0349478 A1    Nov. 3, 2022

(51) Int. Cl.
*F16J 15/3288*    (2016.01)
*F01D 11/00*    (2006.01)

(52) U.S. Cl.
CPC ......... *F16J 15/3288* (2013.01); *F01D 11/003* (2013.01); *F05D 2220/32* (2013.01); *F05D 2240/56* (2013.01)

(58) Field of Classification Search
CPC ...... F16J 15/00; F16J 15/3284; F16J 15/3288; F01D 11/00; F01D 11/003; F05D 2220/00; F05D 2220/32; F05D 2220/321; F05D 2220/3212; F05D 2220/3213; F05D 2220/3215–3219; F05D 2240/00; F05D 2240/56
USPC ....................................................... 277/355
See application file for complete search history.

(56) References Cited

U.S. PATENT DOCUMENTS

| | | | |
|---|---|---|---|
| 9,920,838 B2 | 3/2018 | Klaen et al. | |
| 10,400,896 B2 | 9/2019 | Davis | |
| 2016/0090853 A1* | 3/2016 | Lutjen | F16J 15/0887 |
| | | | 415/173.1 |
| 2016/0319687 A1* | 11/2016 | Thomas | F01D 11/08 |
| 2017/0292395 A1* | 10/2017 | Rioux | F01D 25/246 |
| 2019/0024801 A1* | 1/2019 | Davis | F01D 11/005 |
| 2019/0032786 A1 | 1/2019 | Davis et al. | |
| 2019/0309642 A1* | 10/2019 | Roy Thill | F16J 15/3288 |

OTHER PUBLICATIONS

European Search Report for European Patent Application No. 22170337.4 dated Sep. 14, 2022.

* cited by examiner

*Primary Examiner* — Nathan Cumar
(74) *Attorney, Agent, or Firm* — Carlson, Gaskey & Olds, P.C.

(57) ABSTRACT

A seal assembly for a gas turbine engine according to an example of the present disclosure includes, among other things, a first side plate and a backing plate that extend circumferentially about an assembly axis. The backing plate includes a main body and a first set of abutments that extend outwardly from the main body to abut the first side plate. A first set of pockets are established between adjacent abutments of the first set of abutments. A first brush seal is between the first side plate and the backing plate. Sections of the first brush seal received in respective pockets of the first set of pockets are dimensioned to join together to establish a first sealing relationship with a first gas turbine engine component. A method of assembly is also disclosed.

20 Claims, 10 Drawing Sheets

REINFORCED BRUSH SEAL ASSEMBLY

BACKGROUND

This disclosure relates to gas turbine engines, and more particularly to sealing arrangements incorporating brush seals.

Gas turbine engines typically include a compressor section and a turbine section. The air is compressed in the compressor section. From the compressor section the air is introduced into a combustor section where it is mixed with fuel and ignited in a combustor. Products of this combustion pass downstream over a turbine section to extract energy for driving the compressor section. The components may be exposed to hot gases in the gas path. Various cooling schemes may be utilized to cool portions of the components. A seal may be utilized to limit flow of hot gases from the gas path and/or cooling flow into the gas path.

SUMMARY

A seal assembly for a gas turbine engine according to an example of the present disclosure includes a first side plate and a backing plate that extend circumferentially about an assembly axis. The backing plate includes a main body and a first set of abutments that extend outwardly from the main body to abut the first side plate. A first set of pockets are established between adjacent abutments of the first set of abutments. A first brush seal is between the first side plate and the backing plate. Sections of the first brush seal received in respective pockets of the first set of pockets are dimensioned to join together to establish a first sealing relationship with a first gas turbine engine component.

In a further embodiment of any of the foregoing embodiments, a portion of the first gas turbine engine component that establishes the first sealing relationship comprises a ceramic material.

In a further embodiment of any of the foregoing embodiments, the first gas turbine engine component is a turbine vane or a blade outer air seal.

A further embodiment of any of the foregoing embodiments includes a second side plate that extends circumferentially about the assembly axis, and a second brush seal between the second side plate and the backing plate. The backing plate includes a second set of abutments that extend outwardly from the main body to abut the second side plate, and a second set of pockets are established between adjacent abutments of the second set of abutments. Sections of the second brush seal received in respective pockets of the second set of pockets are dimensioned to join together to establish a second sealing relationship with a second gas turbine engine component.

In a further embodiment of any of the foregoing embodiments, the second side plate includes a plate body and an annular flange extending circumferentially about the assembly axis. The annular flange is dimensioned to engage an outer periphery of the second gas turbine engine component.

In a further embodiment of any of the foregoing embodiments, one or more abutments of the first set of abutments are circumferentially aligned with a respective abutment of the second set of abutments to establish a set of direct load paths through the main body between the first side plate and the second side plate.

In a further embodiment of any of the foregoing embodiments, the first and second sets of abutments are non-uniformly distributed about the assembly axis.

In a further embodiment of any of the foregoing embodiments, the first and second brush seals extend radially inward from an inner periphery of the backing plate relative to the assembly axis to establish the first and second sealing relationships.

In a further embodiment of any of the foregoing embodiments, the first brush seal includes a first bristle pack welded to the first side plate and the backing plate and the second brush seal includes a second bristle pack welded to the second side plate and the backing plate to establish a unitary construction.

In a further embodiment of any of the foregoing embodiments, the main body extends between an inner periphery and an outer periphery. Each abutment of the first set of abutments includes an abutment body extending axially between the main body and an abutment face that contacts the first side plate, and the abutment body extends circumferentially between opposed sidewalls that circumferentially bound respective pockets of the first set of pockets. The sidewalls taper radially inwardly to join at an apex, and the apex is spaced apart from the inner periphery.

A gas turbine engine according to an example of the present disclosure includes a section including an array of blades rotatable about a longitudinal axis, an array of vanes adjacent to the array of blades, an array of blade outer air seals arranged circumferentially about the array of blades relative to the longitudinal axis, and a seal assembly. The seal assembly includes a first side plate and a backing plate that extends circumferentially about the longitudinal axis. The backing plate includes a main body and a first set of abutments that extend outwardly from the main body to abut the first side plate. A first brush seal is between the first side plate and the backing plate. The first brush seal includes sections received between adjacent abutments of the first set of abutments, and the sections of the first brush seal are dimensioned to join together to establish a first sealing relationship with the array of vanes or the array of blade outer air seals.

In a further embodiment of any of the foregoing embodiments, the seal assembly is dimensioned to span between the array of vanes and the array of blade outer air seals. The seal assembly includes a second side plate and a second brush seal between the second side plate and the backing plate. The backing plate includes a second set of abutments that extend outwardly from the main body to abut the second side plate. The second brush seal includes sections received between adjacent abutments of the second set of abutments, and the sections of the second brush seal are dimensioned to join together to establish a second sealing relationship with the array of vanes or the array of blade outer air seals.

In a further embodiment of any of the foregoing embodiments, the array of vanes and the array of blade outer air seals establish an axial gap relative to the longitudinal axis. The axial gap extends from a core flow path, and the seal assembly is dimensioned to span the axial gap. The first and second brush seals extend radially inward from an inner periphery of the backing plate to establish the first and second sealing relationships.

In a further embodiment of any of the foregoing embodiments, each of the vanes includes an airfoil section extending from a platform section that bounds a gas path, the platform section is arranged to establish the first sealing relationship with the first brush seal, and the platform section comprises a ceramic material.

In a further embodiment of any of the foregoing embodiments, each of the vanes includes a metallic spar member secured to a fairing. The fairing comprises a ceramic matrix composite material that establishes the airfoil section and the platform section, and the seal assembly is trapped between one or more of the spar members and one or more of the blade outer air seals.

A method of assembly for a gas turbine engine according to an example of the present disclosure include positioning a first brush seal between a first side plate and an annular backing plate, the backing plate including a main body and a first set of abutments that extend outwardly from the main body to abut the first side plate, and a first set of pockets established between adjacent abutments of the first set of abutments, mechanically attaching the first brush seal to the first side plate and the backing plate to establish a seal assembly, and positioning the seal assembly such that sections of the first brush seal received in respective pockets of the first set of pockets join together to establish a first sealing relationship with a first gas turbine engine component.

In a further embodiment of any of the foregoing embodiments, a portion of the first gas turbine engine component that establishes the first sealing relationship comprises a ceramic matrix composite material.

A further embodiment of any of the foregoing embodiments includes positioning a second brush seal between a second side plate and the backing plate. The backing plate includes a second set of abutments that extend outwardly from the main body to abut the second side plate, and a second set of pockets are established between adjacent abutments of the second set of abutments. The method includes mechanically attaching the second brush seal to the second side plate and the backing plate to establish the seal assembly. The step of positioning the seal assembly occurs such that sections of the second brush seal received in respective pockets of the second set of pockets join together to establish a second sealing relationship with a second gas turbine engine component.

In a further embodiment of any of the foregoing embodiments, the steps of mechanically attaching the first brush seal and mechanically attaching the second brush seal include welding the first and second brush seals to the backing plate and to respective ones of the first and second side plates to establish a unitary construction prior to the step of positioning the seal assembly.

In a further embodiment of any of the foregoing embodiments, each abutment of the first set of abutments is circumferentially aligned with a respective abutment of the second set of abutments to establish a set of direct load paths through the main body between the first side plate and the second side plate.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 15 illustrates an exemplary method of assembly.
Like reference numbers and designations in the various drawings indicate like elements.

DETAILED DESCRIPTION

Figure 1:
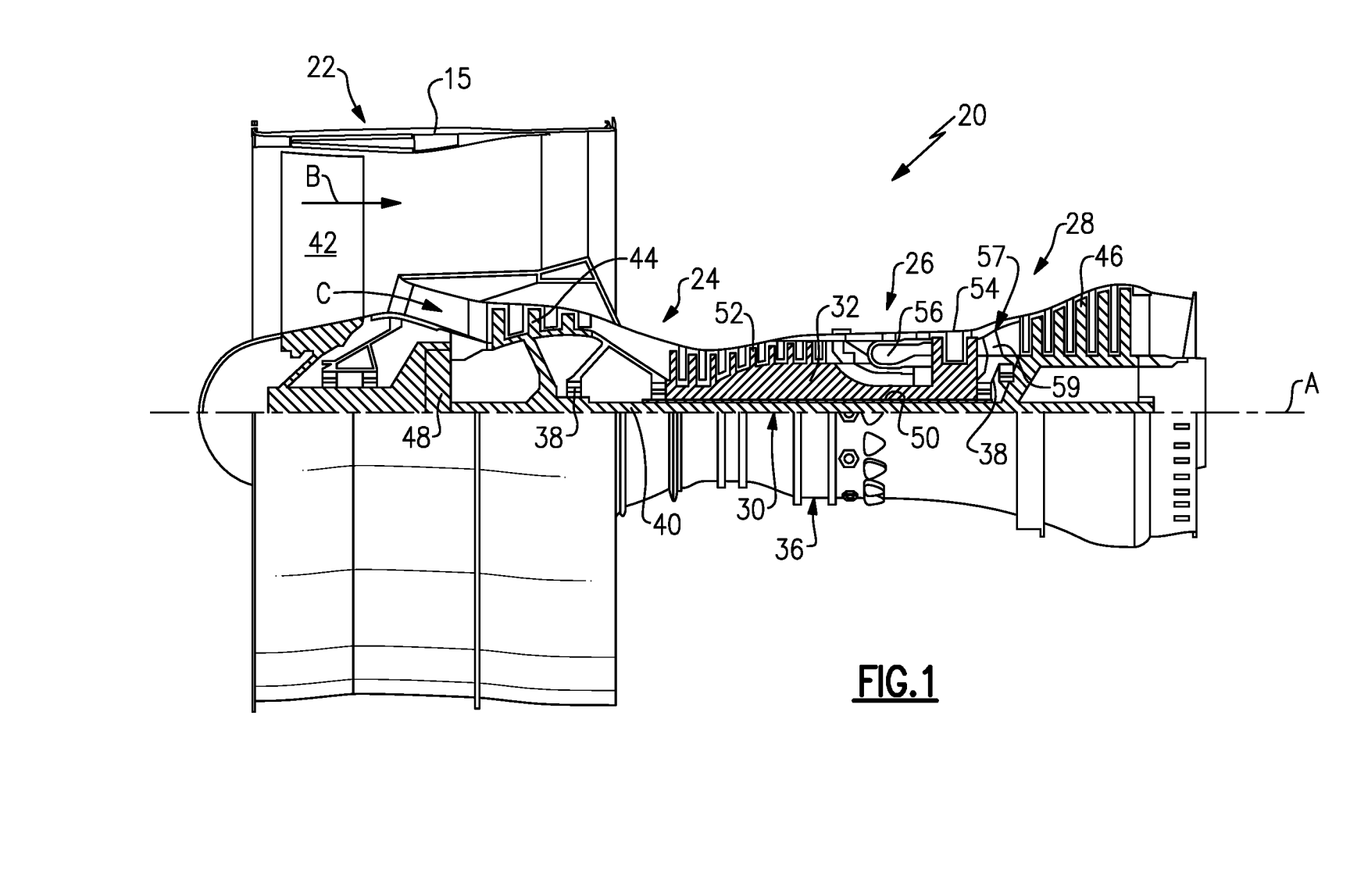
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
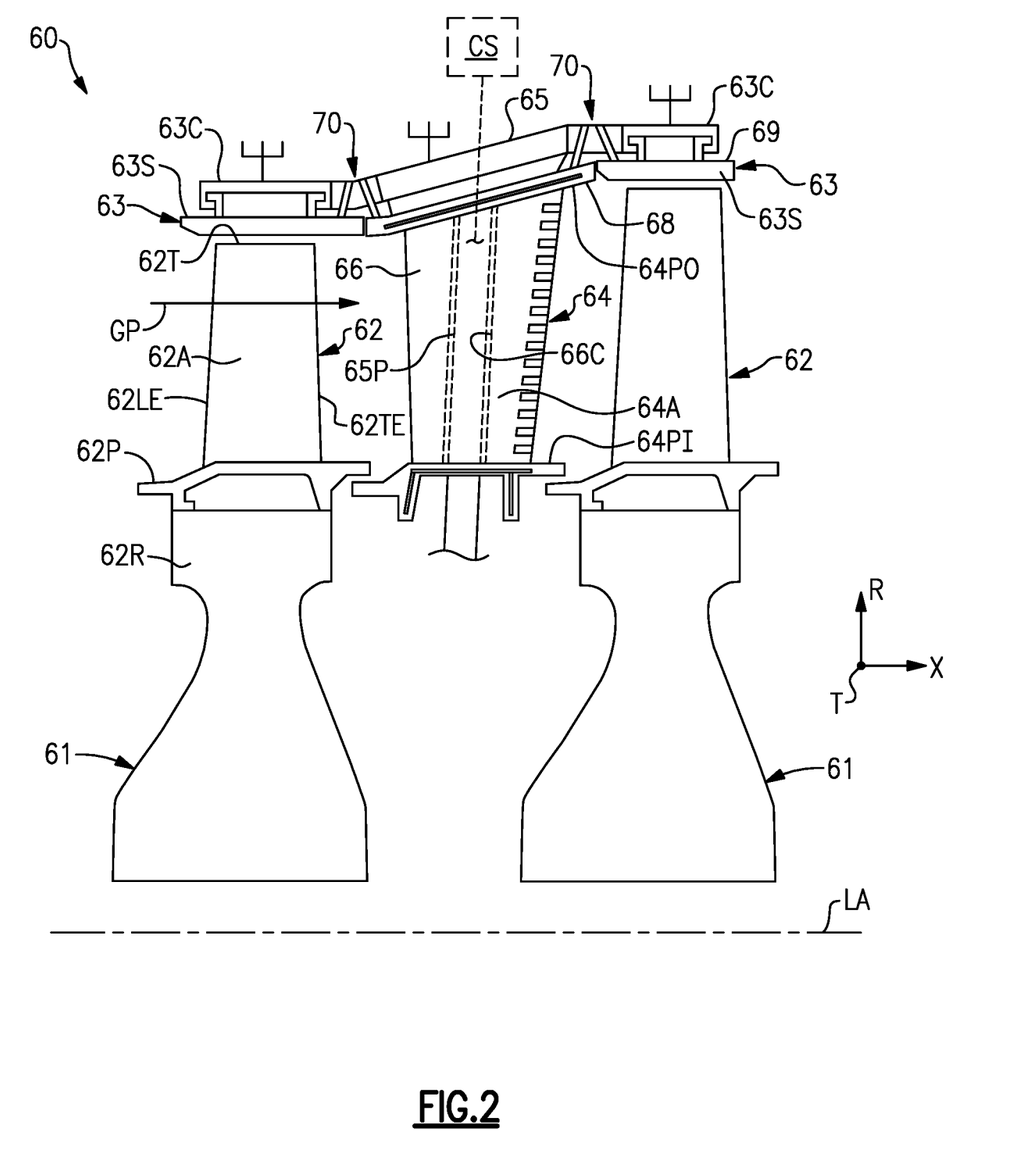
FIG. 2 shows an airfoil arrangement for a section of a gas turbine engine.

FIG. 2 illustrates an exemplary section 60 for a gas turbine engine. The section 60 may be incorporated into the gas turbine engine 20 of FIG. 1, such as the compressor section 24 or the turbine section 28. The section 60 includes a rotor 61 carrying one or more blades or airfoils 62 that are rotatable about a longitudinal axis LA. The longitudinal axis LA may be collinear or otherwise parallel to the engine axis A of FIG. 1.

Each airfoil 62 includes a platform 62P and an airfoil section 62A extending in a radial direction R from the platform 62P to a tip 62T. The airfoil section 62A generally extends in a chordwise or axial direction X between a leading edge 62LE and a trailing edge 62TE. A root section 62R of the airfoil 62 is mounted to, or integrally formed with, the rotor 61. A blade outer air seal (BOAS) 63 is spaced radially outward from the tip 62T of the adjacent airfoil 62. The BOAS 63 can include a plurality of seal arc segments that are circumferentially arranged in an annulus around the longitudinal axis LA. The tip 62T of the airfoil section 62A and adjacent BOAS 63 are arranged in close radial proximity to reduce the amount of gas flow that is redirected toward and over the rotating blade airfoil tip 62T through a corresponding clearance gap.

The BOAS 63 can include one or more seal arc segments 63S mounted or otherwise secured to one or more carriers 63C. Each carrier 63C can be secured to an engine static structure such as the engine case 37 or another portion of the engine static structure 36 of FIG. 1.

Each vane 64 can be positioned along the longitudinal axis LA and adjacent to the airfoil 62. The vane 64 includes an airfoil section 64A extending between an inner platform 64PI and an outer platform 64PO to define a portion of the gas path GP. The inner platform 64PI and outer platform 64PO are dimensioned to bound radially inner and outer portions of the gas path GP.

Each vane 64 can include a spar member 65 secured to a fairing 66. The spar member 65 may include a portion 65P at least partially received in a cavity 66C of the fairing 66. The portion 65P may be a hollow strut or conduit that extends radially inwardly towards the longitudinal axis LA. The spar member 65 may be secured to the engine static structure. The spar member 65 may be a load bearing structure that is dimensioned to at least partially support a respective fairing 66.

The spar member 65 may be coupled to a coolant source CS (shown in dashed lines for illustrative purposes). The coolant source CS can be configured to supply or convey pressurized cooling flow to cool portions of the section 60 including each vane 64. The coolant source CS can include bleed air from an upstream stage of the compressor section 24 (FIG. 1), bypass air, or a secondary cooling system aboard the aircraft, for example. Various materials may be utilized to form the spar member 65 and fairing 66. The spar member 65 may be formed of a metallic material, such as a high temperature metal or alloy. The fairing 66 can be a monolithic component formed of a ceramic material, such as a ceramic matrix composite (CMC) material that establishes the airfoil section 64A and/or platform sections 64PI, 64PO. The CMC materials disclosed herein may include continuous or discontinuous fibers in a matrix arranged in one or more layers to establish a CMC layup.

The section 60 can include an array of airfoils 62, vanes 64, and BOAS 63 arranged circumferentially about the longitudinal axis LA. An array of the BOAS 63 can be distributed in a circumferential or thickness direction T about an array of the airfoils 62 to bound a gas path GP, such as the core flow path C of FIG. 1.

The section 60 can include one or more seal assemblies 70. Each seal assembly 70 can be arranged to establish sealing relationships with one or more adjacent gas turbine engine components of the section 60, such as a first gas turbine engine component 68 and second gas turbine engine component 69 adjacent the gas path GP. The first component 68 can be an adjacent vane(s) 64, and the second component 69 can be an adjacent BOAS 63 as illustrated in FIG. 2, or vice versa. The section 60 can include two or more seal assemblies 70 distributed along the longitudinal axis LA to establish sealing relationships that limit flow to and/or from the gas path GP.

Figure 3:
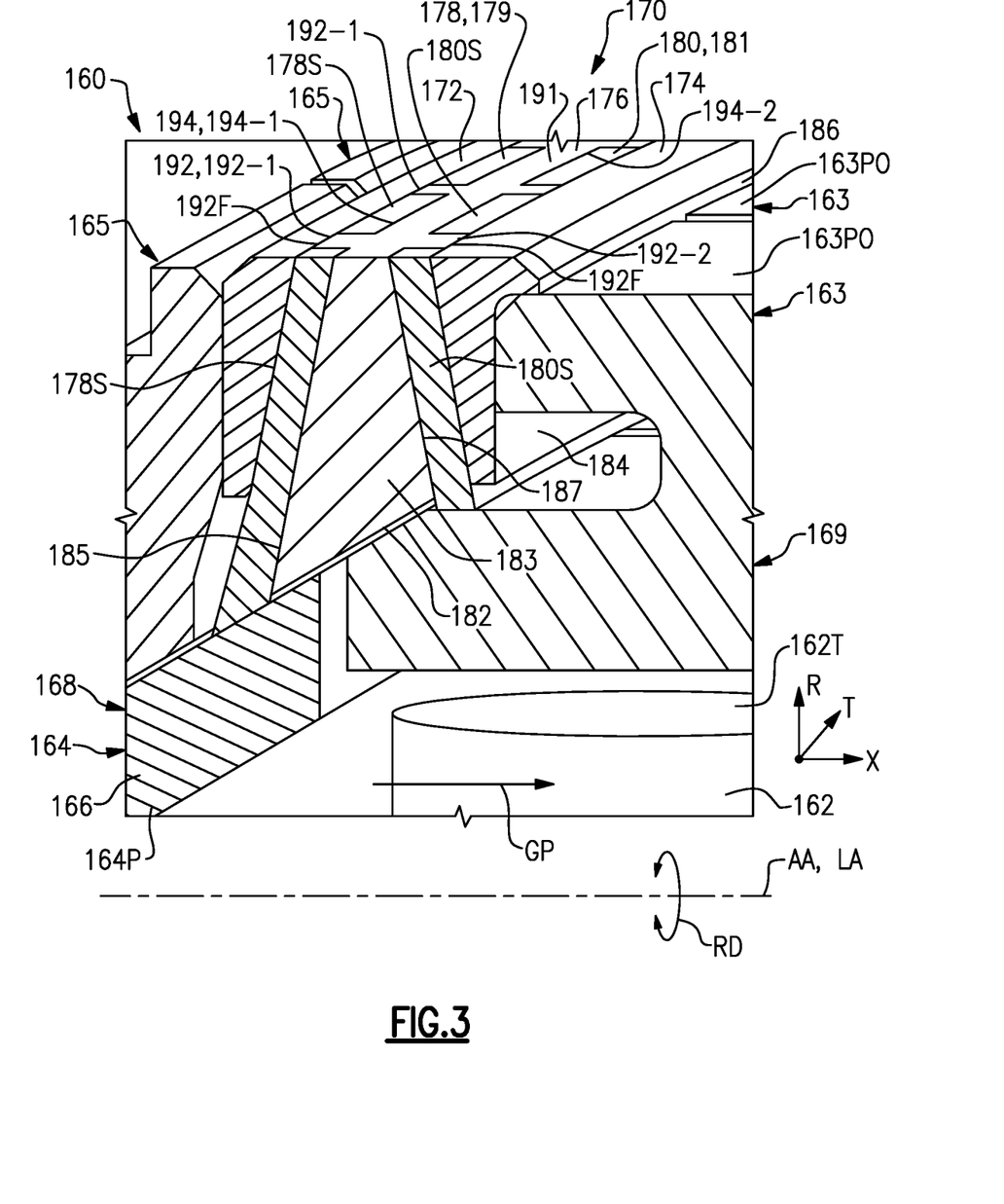
FIG. 3 illustrates a perspective, sectional view of a section including a seal assembly.
Figure 4:
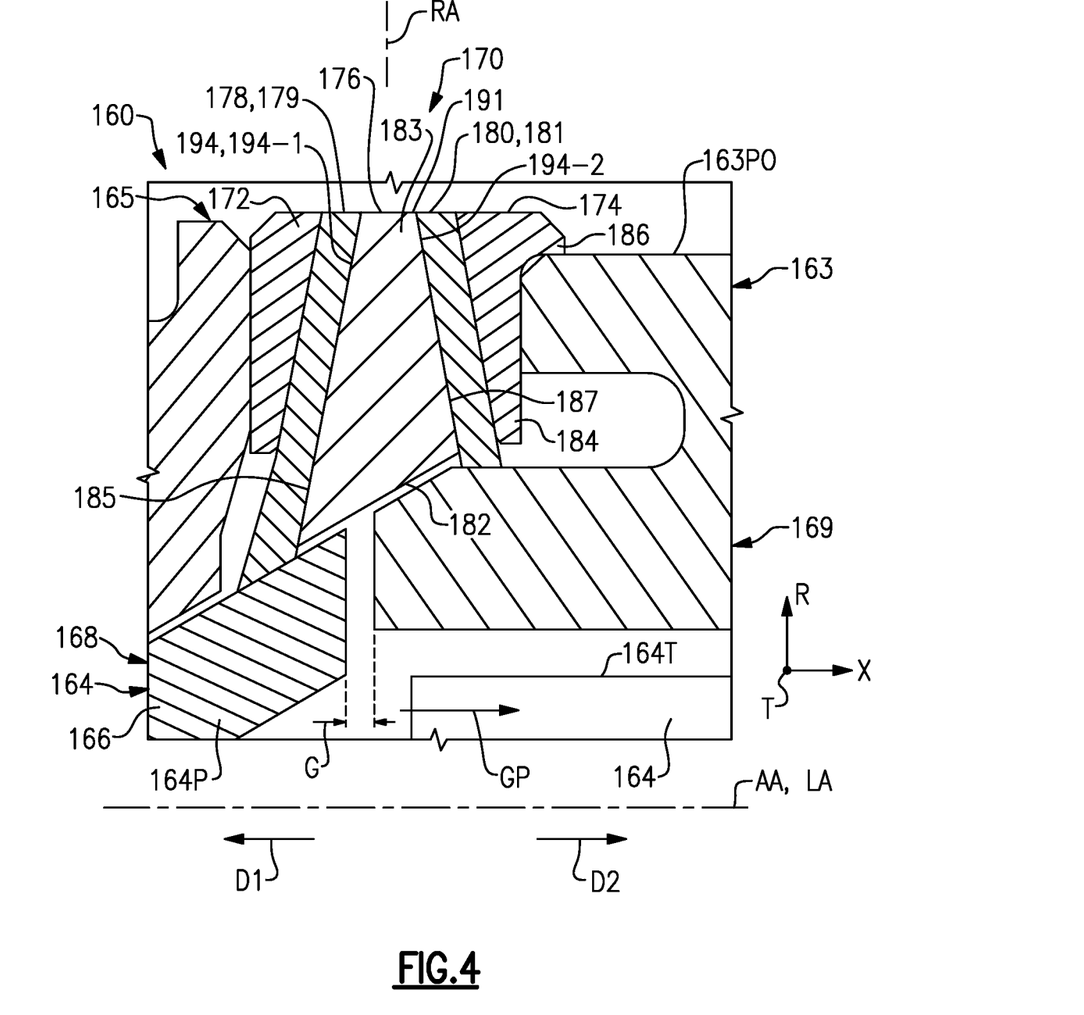
FIG. 4 illustrates a sectional view of the section of FIG. 3.
Figure 5:
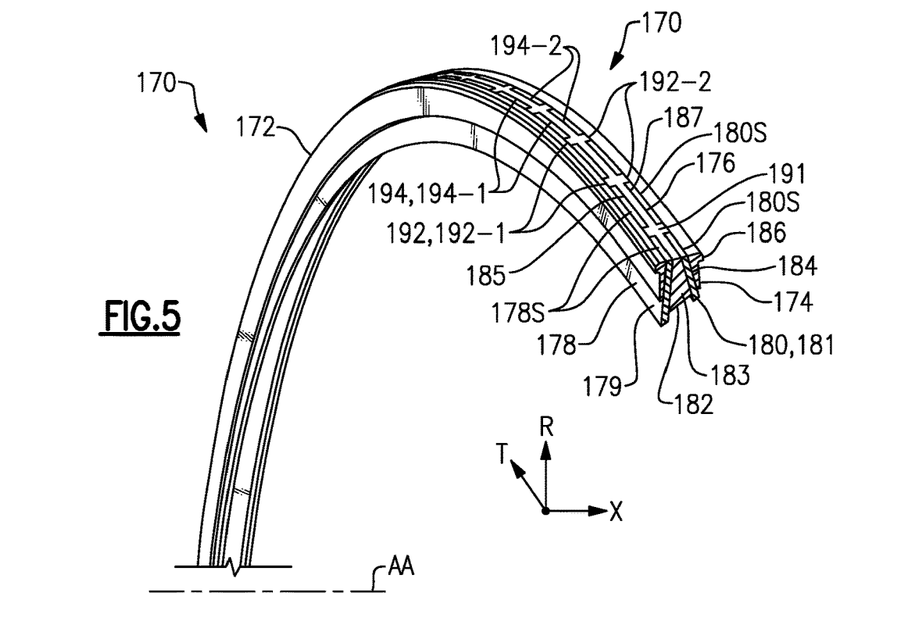
FIG. 5 illustrates an isolated view of the seal assembly of FIG. 3.

FIGS. 3-5 illustrate an exemplary seal assembly 170 for a section 160 of a gas turbine engine. The section 160 and seal assembly 170 may be incorporated into a section of the gas turbine engine 20 of FIGS. 1 and/or 2, such as the turbine section 28. Other portions of the gas turbine engine 20 and other systems may benefit from the teachings disclosed herein, including gas turbine engines lacking a fan for propulsion. In this disclosure, like reference numerals designate like elements where appropriate and reference numerals with the addition of one-hundred or multiples thereof designate modified elements that are understood to incorporate the same features and benefits of the corresponding original elements. The seal assembly 170 can be arranged to establish sealing relationships with non-rotating or static components and/or rotating components such as shafts and bearing arrangements (e.g., inner shaft 40 or outer shaft 50 of FIG. 1).

The seal assembly 170 can include a first side plate 172, second side plate 174, backing plate 176, first brush seal 178 and second brush seal 180. The first side plate 172, second side plate 174, backing plate 176 and brush seals 178, 180 can have an arcuate geometry and can be dimensioned to extend circumferentially about an assembly axis AA, as illustrated in FIG. 3. The assembly axis AA may be colinear with or otherwise parallel to a longitudinal axis LA of the section 160. The seal assembly 170 can be dimensioned to extend along an array of vanes 164 and/or array of BOAS 163 in the circumferential direction T as illustrated in FIG. 3 and/or span between the array of vanes 164 and array of BOAS 163 in the axial direction X as illustrated by FIG. 4. Each of the first side plate 172, second side plate 174, backing plate 176 and/or brush seals 178, 180 can be a full hoop or can include one or more arc segments dimensioned to extend at least partially or completely about the assembly axis AA.

The first and second brush seals 178, 180 may cooperate to establish a reinforced double brush seal arrangement. The first brush seal 178 can include a first bristle pack 179. The second brush seal 180 can include a second bristle pack 181. Each bristle pack 179, 181 can include a set of bristles or tufts that are joined together as a unit. The bristles may be formed of non-metallic materials or metallic materials such as high temperature metal or nickel-based alloy. The seal assembly 170 can have a unitary construction. The bristle packs 179, 181 may be arranged in a compressed state between the side plates 172, 174 and backing plate 176. The first bristle pack 179 can be welded or otherwise mechanically attached to the first side plate 172 and backing plate 176 and the second bristle pack 181 can be welded or otherwise mechanically attached to the second side plate 174 and backing plate 176 to establish the unitary construction.

Figure 10:
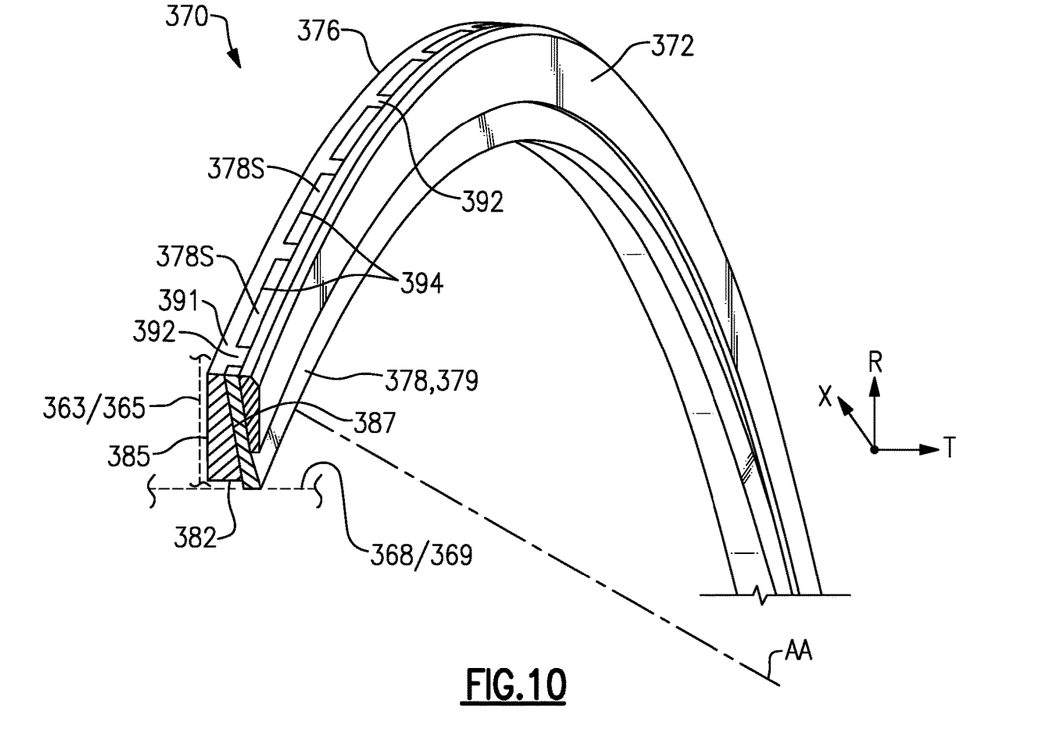
FIG. 10 illustrates an isolated view of another exemplary seal assembly.

The first brush seal 178 and second brush seal 180 can be arranged in various configurations. The first and second brush seals 178, 180 can be positioned on opposite sides of the backing plate 176. The first brush seal 178 can be sandwiched or otherwise situated between the first side plate 172 and backing plate 176. The second brush seal 180 can be sandwiched or otherwise situated between the second side plate 174 and backing plate 176. In some implementations, the first and/or second side plates 172, 174 are omitted (see, e.g., FIG. 10).

The first and second brush seals 178, 180 can be arranged at various positions and/or orientations relative to each other and one or more gas turbine engine components to establish respective sealing relationships. The brush seals 178, 180 can be dimensioned to extend radially inward and/or radially outward in the same or different directions relative to the assembly axis AA, or can be dimensioned to extend axially in the same or different directions relative to the assembly axis AA.

The first brush seal 178 can be dimensioned to establish a first sealing relationship with a first gas turbine engine component 168. The second brush seal 180 can be dimensioned to establish a second seal relationship with a second gas turbine engine component 169. The gas turbine engine components 168, 169 can include any of the components disclosed herein. The components 168, 169 can be different portions of the same gas turbine engine component or can be separate and distinct components. For example, the first component 168 can be a turbine vane or associated mounting structure, such as the vane 164, and the second component 169 can be a BOAS or associated mounting structure, such as the BOAS 163 or the carrier 63C (FIG. 2). In the illustrated example of FIG. 3, the first brush seal 178 is dimensioned to establish a first sealing relationship with the array of vanes 164, and the second brush seal 180 is dimensioned to establish the second sealing relationship with the array of blade outer air seals 163.

Various materials may be utilized to form the first and second components 168, 169, including any of the materials disclosed herein. For example, portions of the first and/or second components 168, 169 that establish the respective first and/or second sealing relationships may comprise a ceramic material such as a monolithic ceramic or CMC material. Monolithic ceramics may be, but are not limited to, silicon carbide (SiC) or silicon nitride ($Si_3N_4$).

The array of vanes 164 and array of BOAS 163 can establish an axial gap G relative to the longitudinal axis LA, as illustrated in FIG. 4. The axial gap G extends outwardly from a gas path GP such as the core flow path C of FIG. 1. The seal assembly 170 can be dimensioned to span the axial gap G between adjacent vanes 164 and BOAS 163.

Each of the vanes 164 can include a fairing 166 that establishes a platform section 164P of the vane 164. The platform section 164P can be one of the platform sections 64PI, 64PO of the vane 64 of FIG. 2, such as the outer platform section 64PO. The platform section 164P can be arranged to establish the first and/or sealing relationships with the respective brush seal 178, 180, such as the first brush seal 178 as illustrated in FIGS. 3-4, and can comprise any of the materials disclosed herein.

The first and second brush seals 178, 180 can be dimensioned to extend radially inward in the radial direction R from an inner periphery 182 of the backing plate 176 relative to the assembly axis AA to establish the first and second sealing relationships. The first and second brush seals 178, 180 can be dimensioned such that the first and second sealing relationships are established at the same radial position or at different radial positions relative to the longitudinal axis LA as illustrated in FIG. 4.

Various techniques may be utilized to secure the seal assembly 170. The seal assembly 170 may be dimensioned to be trapped between one or more (or each) of the spar members 165 and one or more (or each) of the BOAS 163 opposing the spar members 165 in an installed position, as illustrated in FIGS. 3-4. In the installed position, the spar members 165 and BOAS 163 cooperate to limit axial movement of the seal assembly 170 relative to the longitudinal axis LA.

The second side plate 174 can include a plate body 184 and an annular flange 186 extending outwardly from the plate body 184. The annular flange 186 can be dimensioned to extend circumferentially in the circumferential direction T about the assembly axis AA. The annular flange 186 can be dimensioned to engage an outer periphery of the second component 169 (or first component 168), such as an outer periphery 163PO of two or more BOAS 163 as illustrated in FIG. 3 to secure the seal assembly 170 to an engine static structure, such as the engine static structure 36 of FIG. 1. Engagement between the annular flange 186 and second component 169 can limit radial movement of the seal assembly 170 in the radial direction R relative to the longitudinal axis LA.

The brush seals 178, 180 can be arranged at various orientations relative to each other to establish the respective sealing relationships. The backing plate 176 can have a generally quadrilateral or trapezoidal cross-sectional geometry. The backing plate 176 can include a main body 183 extending radially between the inner periphery 182 and an outer periphery 191 and circumferentially between first and second sidewalls 185, 187 on opposite sides of the main body 183. The inner and outer peripheries 182, 191 can be substantially parallel to each other or can be transverse as illustrated in FIG. 4. The sidewalls 185, 187 can be substantially parallel to each other or can be transverse as illustrated in FIG. 4.

The sidewalls 185, 187 can be dimensioned such that the brush seals 178, 180 slope outwardly from the outer periphery 191 of the backing plate 176 towards the inner periphery 182 of the backing plate 176. The first sidewall 185 can be dimensioned such that the first brush seal 178 slopes outwardly from the outer periphery 191 in a first direction D1 relative to the assembly axis AA, and the second sidewall 187 can be dimensioned such that the second brush seal 180 slopes outwardly from the outer periphery 191 in a second direction D2 relative to the assembly axis AA, as illustrated in FIG. 4. The second direction D2 can be opposed to the first direction D1. The sidewalls 185, 187 can be dimensioned to have a major component in the radial direction R and a minor a component in the axial direction X to establish the sloping arrangement. For example, the first and/or second brush seals 178, 180 can be angled approximately 5 degrees to approximately 45 degrees relative to a radial axis RA extending in the radial direction R (RA shown in dashed lines in FIG. 4 for illustrative purposes). For the purposes of this disclosure, the terms "substantially" and "approximately" mean±5 percent of the stated value or relationship unless otherwise indicated.

The seal assembly 170 may communicate loads between adjacent components of the section 160 due to various loads experienced during engine operation. One of the components may apply non-uniform loads (e.g., circumferentially), which may cause another one of the adjacent components to pivot or tilt. The backing plate 176 can include various reinforcement features to facilitate distribution of loads through the seal assembly 170. Each reinforcement feature can be dimensioned to establish a load path between the first and second side plates 172, 174 and adjacent portions of the section 160 including the spar members 165 and BOAS 163.

Referring to FIGS. 3 and 5, with continuing reference to FIG. 4, the backing plate 176 can include one or more abutments (or castellations or reinforcement members) 192 that extend outwardly from the main body 183. The abutments 192 can include a first set of abutments 192-1 and a second set of abutments 192-2. The first set of abutments 192-1 can extend outwardly from the first sidewall 185 of the main body 183 to abut the first side plate 172, and the second set of abutments 192-2 can extend outwardly from the second sidewall 187 of the main body 183 to abut the second side plate 174, or vice versa.

One or more (or each) abutments 192 of the first set of abutments 192-1 can be substantially circumferentially aligned with a respective abutment 192 of the second set of abutments 192-2 to establish a set of direct load paths through the main body 183 between the first side plate 172 and the second side plate 174, as illustrated by FIGS. 3 and 5. In other implementations, one or more of the abutments 192 of the first set of abutments 192-1 is at least partially or completely circumferentially offset from each of the abutments 192 of the second set of abutments 192-1.

Figure 7:
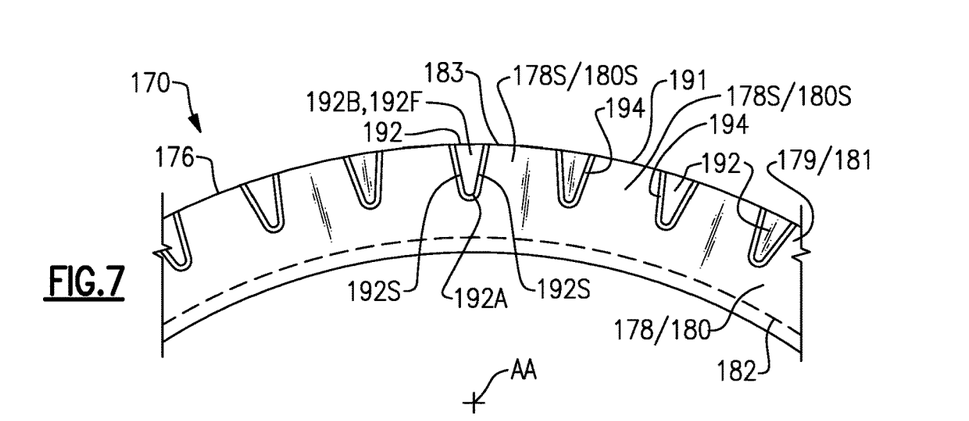
FIG. 7 illustrates the backing plate of FIG. 5 arranged relative to a brush seal.

The abutments 192 can be circumferentially distributed about the assembly axis AA to establish a plurality of pockets (or recesses) 194. The backing plate 176 can be dimensioned such that a first set of pockets 194-1 are established between adjacent abutments 192 of the first set of abutments 192-1 and such that a second set of pockets 194-2 are established between adjacent abutments 192 of the first set of abutments 192-2. One or more sections 178S of the first brush seal 178 are received in respective pockets 194 of the first set of pockets 194-1, and one or more sections 178S of the second brush seal 180 are received in respective pockets 194 of the second set of pockets 194-2 as illustrated in FIGS. 3, 5 and 7. The sections 178S, 180S of the brush seals 178, 180 can be dimensioned to join together to establish the respective first and second sealing relationships with the respective first and second components 168, 169, as illustrated in FIG. 3 (see also FIGS. 5 and 7). Each of the sections 178S, 180S can include one or more bristles or tufts in the respective bristle packs 179, 181.

The abutments 192 can have various geometries, including polygonal geometries such as triangular-shaped and quadrilateral-shaped cross-sectional geometries that facilitate tufts or bristles of the bristle packs 179, 181 to be laid at specified angles and orientations, and that can facilitate supporting applied loads through the backing plate 176. Other geometries may be utilized, such as elliptical-shaped cross-sectional geometries. The geometry of the abutments 192 may be utilized to set an orientation of adjacent bristles or tufts of the brush seals 178, 180.

Figure 6:
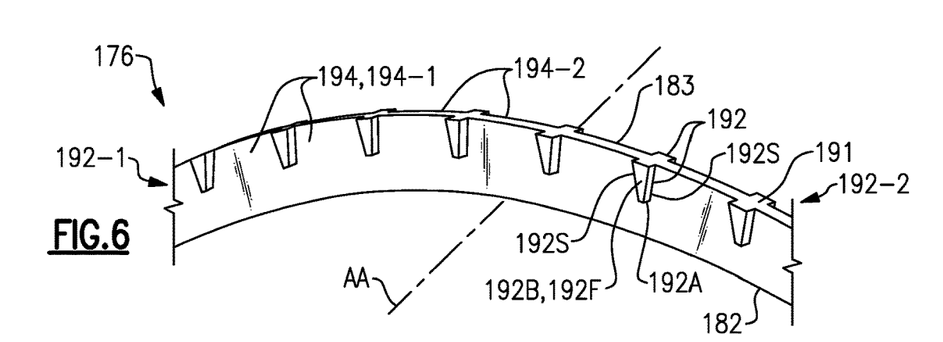
FIG. 6 illustrates an isolated view of a backing plate of the seal assembly of FIG. 5.

In the illustrative example of FIGS. 6-7, each abutment 192 has a generally triangular-shaped geometry. Each abutment 192 includes an abutment body 192B extending axially between the main body 183 and an abutment face 192F. Each abutment face 192F can be dimensioned to contact the respective side plate 172, 174, as illustrated in FIG. 3. The abutment body 192B can be dimensioned to extend circumferentially between opposed sidewalls 192S that circumferentially bound the respective pockets 194. The sidewalls 192S can be dimensioned to taper radially inwardly to join at an apex 192A. The apex 192A can be spaced apart from the inner periphery 182 of the backing plate 176. The abutments 192 can be dimensioned such that an area of each pocket 194 expands in the radial direction towards the inner periphery 182 of the backing plate 176. The respective sections 178S, 180S of the first and second brush seals 178, 180 can be dimensioned or arranged to substantially follow a contour of the adjacent sidewalls 192S of the abutments 192, as illustrated in FIG. 7.

The abutment faces 192F of the abutments 192 may be dimensioned to facilitate uniform distribution of loads through the backing plate 176. A contact area ratio can be established as a combined surface area of the abutment faces 192F of the first and second sets of abutments 192-192-2 divided by a combined surface area of the first and second sidewalls 185, 187 excluding the abutment faces 192F. The contact area ratio can be equal to or greater than about 0.05, or more narrowly less than or equal about 0.50. In implementations, the contact area ratio is equal to or greater than about 0.10 and is less than or equal to about 0.25.

The backing plate 176 can establish various distributions of the abutments 192. The first set of abutments 192-1 and/or second set of abutments 192-2 can be substantially uniformly distributed about the assembly axis AA, as illustrated in FIGS. 5-7. In other implementations, the first set of abutments 192-1 and/or second set of abutments 192-2 can be non-uniformly distributed about the assembly axis AA such that the spacing between adjacent pairs of abutments 192 differs.

Figure 8:
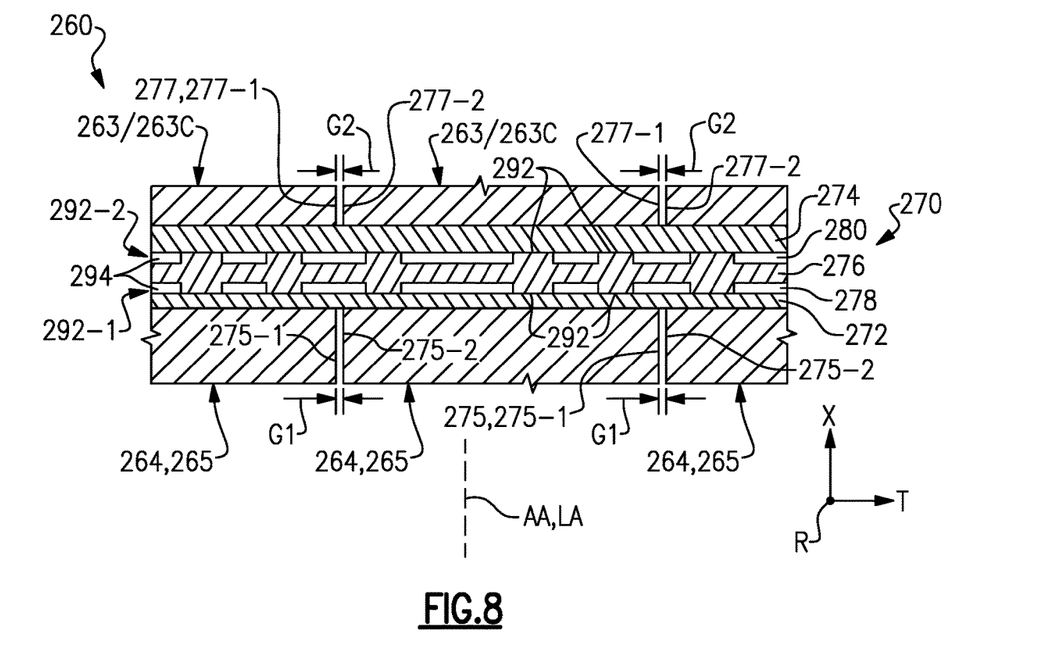
FIG. 8 illustrates an exemplary section of a gas turbine engine.
Figure 9:
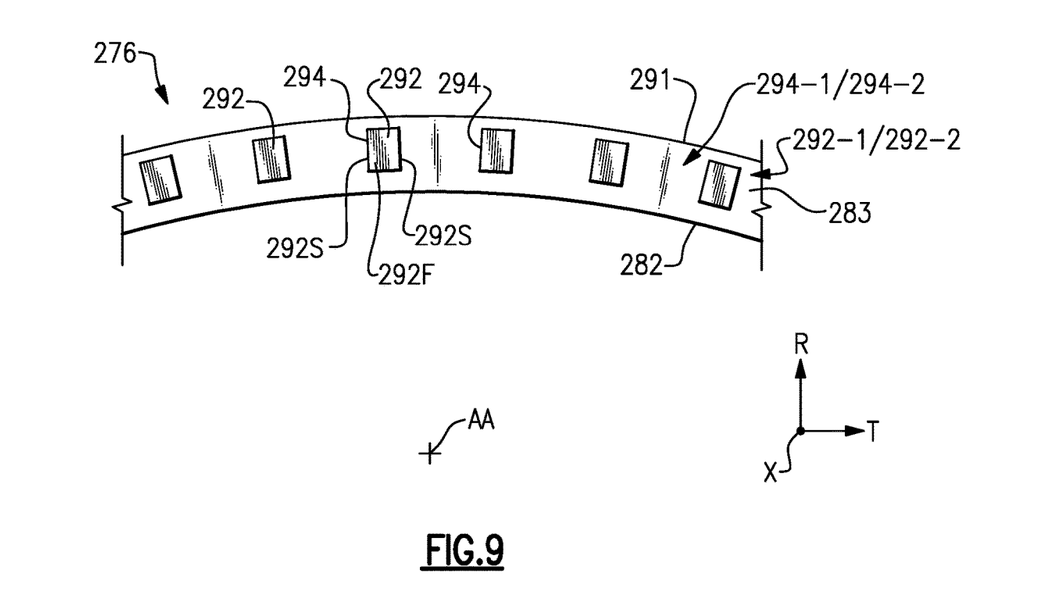
FIG. 9 illustrates an isolated view of a backing plate of the section of FIG. 8.

For example, in the illustrative example of FIG. 8, adjacent spar members 265 and adjacent carriers 263C or another portion of BOAS 263 arranged in an array about the longitudinal axis LA. Mate faces 275 establish intersegment gaps G1. Mate faces 277 establish intersegment gaps G2. The mate faces 275 may be established by adjacent spar members 265 or another portion of vanes 264. The mate faces 277 may be established by adjacent BOAS 263 and/or carriers 263C. A backing plate 276 can include a first set of abutments 292-1 and/or second set of abutments 292-2 distributed relative to the mate faces 275, 277. The abutments 292 can have a generally rectangular-shaped cross-sectional geometry and can be spaced apart from the inner and outer peripheries 282, 291 of the backing plate 276, as illustrated in FIG. 9.

The first set of abutments 292-1 and/or second set of abutments 292-2 can be non-uniformly distributed about the assembly axis AA such that the spacing between adjacent pairs of abutments 292 differs. The arrangement of abutments 292 can be more concentrated adjacent one the mate faces 275, 277 of the respective component. For example, a greater number of the abutments 292 between mate faces 275-1/277-1, 275-2/277-2 can be distributed relatively closer to mate faces 275-1/275-2 than the abutments 292 adjacent the mate faces 275-2, 277-2 as illustrated in FIG. 8. The abutments 292 may be arranged such that each abutment 292 in the first and second sets of abutments 292-1, 292-2 is circumferentially offset from the mate faces 275, 277. The non-uniform distribution of abutments 292 relative to the mate faces 275, 277 and respective components may reduce a likelihood of tilting of the components including the BOAS 263 and/or carriers 263C that may otherwise occur due to loads communicated from the spar members 265 or another portion of the vanes 264 during engine operation.

In implementations, one of the brush seals and side plates can be eliminated. In the illustrative example of FIG. 10, seal assembly 370 includes a first side plate 372, a backing plate 376 and a first brush seal 378 that cooperate to establish a reinforced single brush seal arrangement. The first brush seal 378 can be dimensioned to establish a first sealing relationship with a first or second gas turbine engine component 368, 369 (shown in dashed lines for illustrative purposes). The component 368/369 can include any of the gas turbine engine components disclosed herein.

Figure 11:
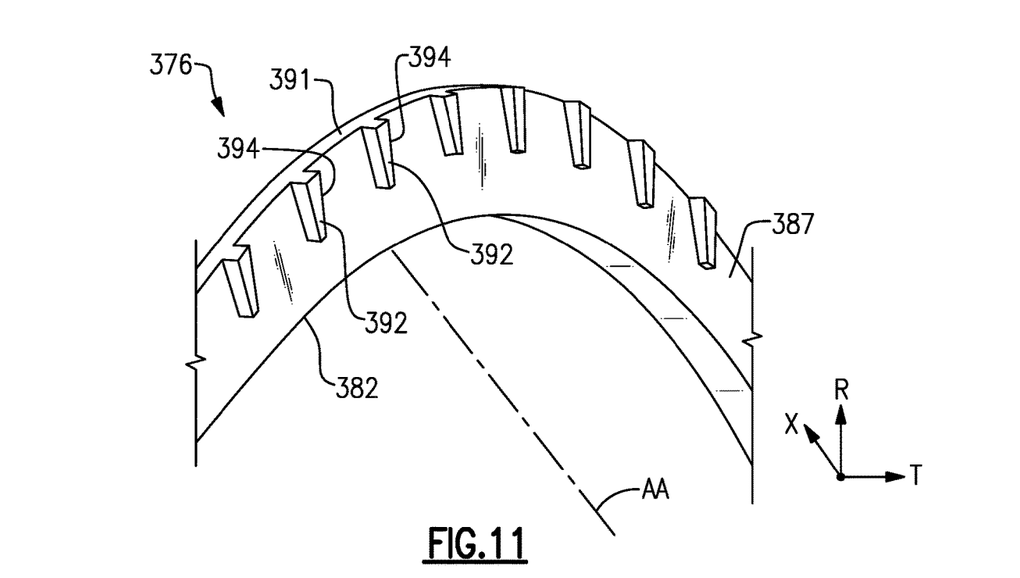
FIG. 11 illustrates an isolated view of a backing plate of the seal assembly of FIG. 10.

The backing plate 376 includes one or abutments 392 extending from one of the sidewalls 385, 387 of the backing plate 376, such as the sidewall 387. Another one of the sidewalls 385, 387 can exclude any abutments 392, such as the sidewall 385 as illustrated in FIG. 11. The sidewall 385 can be dimensioned to abut against any of the components disclosed herein, such as a BOAS 363 (or carrier) or spar member 365 (shown in dashed lines for illustrative purposes).

Figure 12:
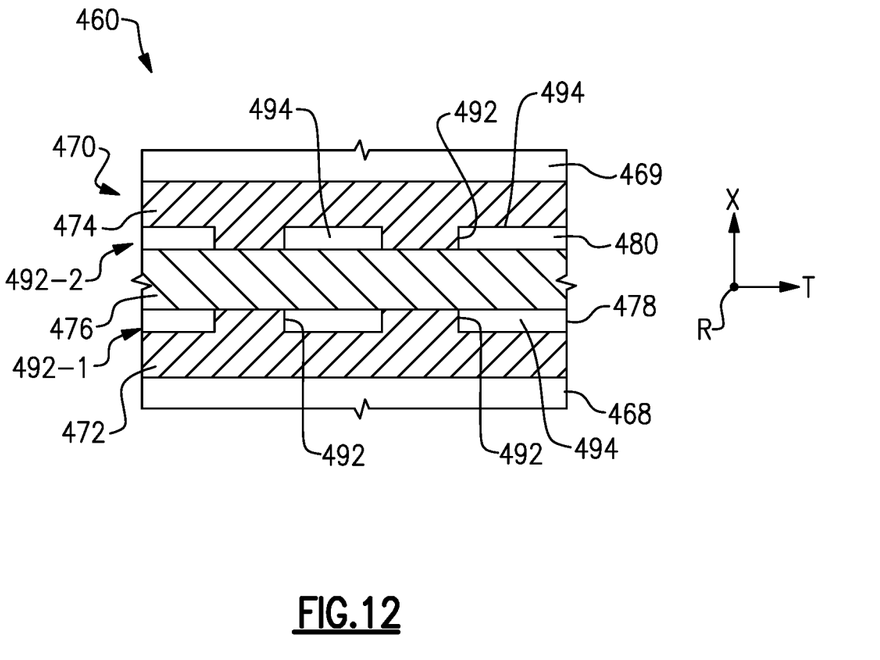
FIG. 12 illustrates a section including a seal assembly according to another example.

The abutments can be incorporated into other portions of the seal assembly to establish respective load paths. In the illustrative example of FIG. 12, seal assembly 470 includes first and second side plates 472, 474, backing plate 476 and first and second brush seals 478, 480. The first side plate 472 can include a first set of abutments 492-1. The second side plate 474 can include a second set of abutments 492-2. The first and second sets of abutments 492-1, 492-2 can be dimensioned to abut against the backing plate 476 to a set of load paths between the side plates 472, 474 and adjacent components 468, 469.

Figure 13:
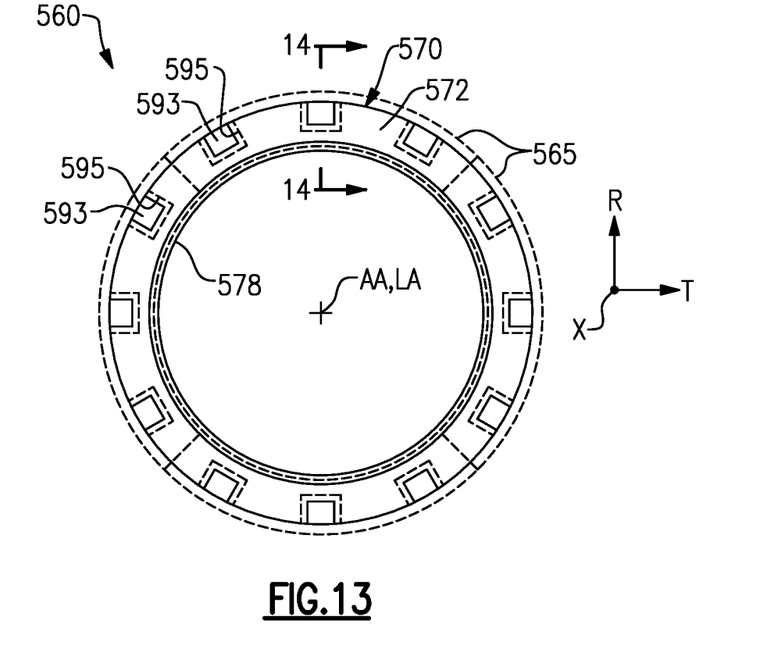
FIG. 13 illustrates a seal assembly according to another example.
Figure 14:
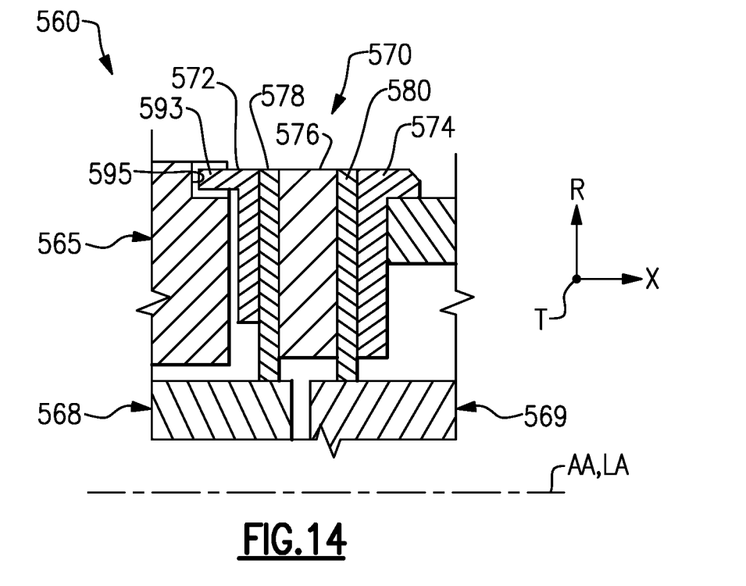
FIG. 14 illustrates a sectional view of the seal assembly of FIG. 13.

FIGS. 13-14 illustrate a section 560 including a seal assembly 570 according to another example. The seal assembly 570 can include one or more anti-rotation features that clock the seal assembly 570 and limit relative movement between the seal assembly 570 and adjacent components 568, 569. In implementations, the anti-rotation features can include one or more protrusions or keys 593 that may mate or interfit with respective recesses or keyways 595 associated with the components 568, 569 to limit relative rotation. The keys 593 may extend outwardly from one of the side plates 572, 574, such as the first side plate 572. The keyways 595 may be established in the one of the gas turbine engine components 568, 569 or associated support structure, such as one or more of the spar members 565 (shown in dashed lines in FIG. 13 for illustrative purposes). Each keyway 595 is dimensioned to interfit with a respective one of the keys 593 to limit circumferential movement in the circumferential direction T between the seal assembly 570 and adjacent components 568, 569. The section 560 can include an array of the keys 593 and keyways 595 distributed about the longitudinal axis LA. In implementations, the anti-rotation features are incorporated in the second side plate 574 and the second component 569 or associated structure.

Figure 15:
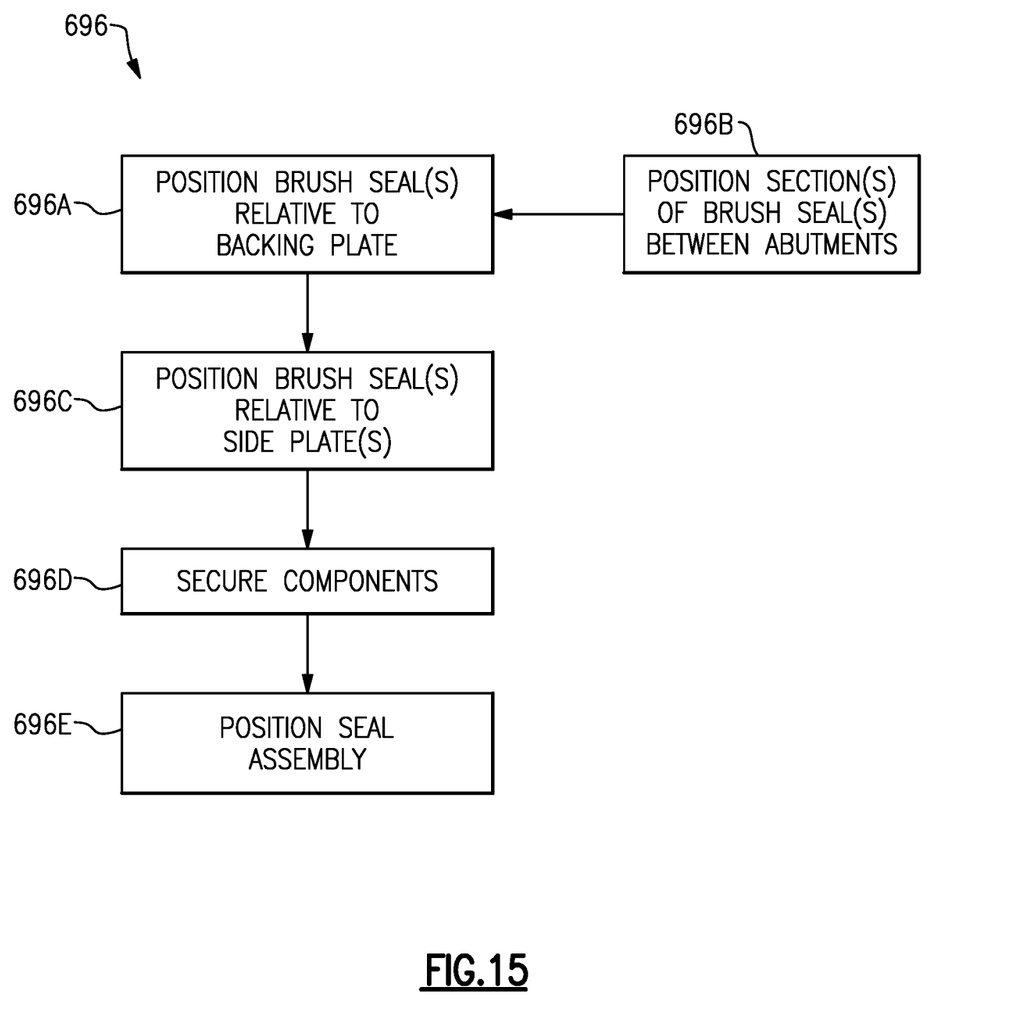

FIG. 15 illustrates an exemplary method of assembly for a gas turbine engine in a flowchart 696. The method may be utilized to assemble any of the sections and seal assemblies disclosed herein. Reference is made to the section 160 of FIGS. 3-4 for illustrative purposes.

At step 696A, the first brush seal 178 and second brush seal 180 are positioned relative the backing plate 176. Step 696A can include positioning the first brush seal 178 and second brush seal 180 on opposite sides of the backing plate 176.

Step 696A can include positioning one or more sections 178S, 180S of the respective brush seals 178, 180 between adjacent abutments 192 of the first and second sets of abutments 192-1, 192-2 of the backing plate 176 at step 696B. Step 696B can include positioning the sections 178S, 180S in respective pockets 194 of the first and second sets of pockets 194-1, 194-2 established by the abutments 192 such that the sections 178S, 180S of the respective brush seals 178, 180 join together to establish a sealing relationship with the respective gas turbine engine component 168, 169.

At step 696C, the first brush seal 178 and second brush seal 180 are positioned relative to the first side plate 172 and second side plate 174. Step 696C can include positioning the first and second brush seals 178, 180 between the side plates 172, 174 such that the first brush seal 178 is sandwiched between the first side plate 172 and backing plate 176 and such that the second brush seal 180 is sandwiched between the second side plate 174 and backing plate 176.

At step 696D, two or more of the components can be secured together to establish the seal assembly 170, including the first and second brush seals 178, 180, first and second plates 172, 174 and/or backing plate 176. Various techniques can be utilized to secure the components, including any of the techniques disclosed herein. Step 696D can include mechanically attaching the brush seals 178, 180 to the backing plate 176 and respective ones of the side plates 172, 174 to establish the seal assembly 170. Step 696D can include welding the brush seals 178, 180 to the backing plate 176 and to respective ones of the side plates 172, 174 to establish a unitary construction, which can occur prior to positioning the seal assembly 170 relative to one or more gas turbine engine components 168, 169. In other implementations, the brush seals 178, 180 are crimped to secure the brush seals 178, 180 to the side plates 172, 174 and backing plate 176.

At step 696E, the seal assembly 170 is positioned such that the first brush seal 178 establishes a first sealing relationship with the first component 168 and such that the second brush seal 180 establishes a second sealing relationship with the second component 169. The second component 169 can be adjacent to the first component 168. A portion of the first component 168 that establishes the first sealing relationship and/or a portion of the second component 169 that establishes the second sealing relationship can comprise any of the materials disclosed herein, including a ceramic material such as a monolithic ceramic or CMC material. Step 696E can occur such that the sections 178S, 180S of the respective brush seals 178, 180 join together to establish the first and second sealing relationships with the respective gas turbine engine component 168, 169.

Step 696E can include positioning the seal assembly 170 as a single unit established at step 696D relative to the components 168, 169. In other implementations, step 696A, 696B, 696C and/or 696D can occur during and/or subsequent to step 696E. Step 696E can include positioning the seal assembly 170 at any of the positions and/or orientations disclosed herein. Step 696E can include positioning the seal assembly 170 to span across a gap between the adjacent components 168, 169, such as the axial gap G of FIG. 4.

Step 696E can occur such that the first and/or second sets of abutments 192 establish respective direct load paths between adjacent components on opposite sides of the seal assembly 170, such as the spar members 165 and BOAS 163. For example, each abutment 192 of the first set of abutments 192-1 can be circumferentially aligned with a respective abutment 192 of the second set of abutments 192-2 to establish a set of direct load paths through the main body 183 of the backing plate 176 between the first side plate 172 and second side plate 174.

The bristles of the brush seals 178, 180 may be angled in the circumferential direction prior to positioning the seal assembly 170 relative to the components 168, 169. For example, the bristles may be oriented at an approximately 45 degree angle in a clockwise or counterclockwise direction. Step 696E can include rotating the seal assembly 170 about the longitudinal axis LA in a rotational direction RD (FIG. 3) subsequent to positioning the seal assembly 170 in abutment with the first and/or second components 168, 169 to establish an interference fit between the brush seals 178, 180 and respective components 168, 169. The rotational direction RD can be in a clockwise or counterclockwise direction.

The disclosed seal assemblies can be utilized to establish a reinforced seal arrangement, including a reinforced single or double seal assembly. The disclosed arrangements of abutments or castellations can serve to reinforce the brush seals in scenarios in which the seal assembly undergoes loading during engine operation. The abutments can more uniformly transfer loads between adjacent components and may reduce stress concentrations in the seal assembly. The abutments may be utilized to improve support along the weld joint and bristles, which may reduce a likelihood of overstressing components which may lead to degradation of the seal assembly.

The brush seals may be packaged in a single unit, which may reduce assembly time and complexity. The disclosed seal assemblies may improve sealing effectiveness and reduce parts counts by utilizing a common backing plate for the brush seals. The disclosed seal assemblies may be relatively more compact, which may facilitate incorporation of the seal assemblies in reduced space designs. The disclosed seal assemblies may reduce the need to incorporate one or more face seals that may otherwise extend between the backing plate and mating hardware, which can reduce complexity and weight. The seal assemblies may be utilized to establish sealing relationships with components incorporating CMC materials, which may be associated with relatively greater leaking paths and variability due to interaction between the CMC components and metallic support.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
   a first side plate and a backing plate that extend circumferentially about an assembly axis, wherein the backing plate includes a main body and a first set of abutments that extend outwardly from the main body to abut the first side plate, and a first set of pockets are established between adjacent abutments of the first set of abutments; and a first brush seal between the first side plate and the backing plate, wherein the first set of pockets are dimensioned to separate adjacent sections of the first brush seal received in respective pockets of the first set of pockets, and the adjacent sections of the first brush seal are dimensioned to join together outwardly of the first set of pockets to establish a first sealing relationship with a first gas turbine engine component.

2. The assembly as recited in claim 1, wherein a portion of the first gas turbine engine component that establishes the first sealing relationship comprises a ceramic material.

3. The assembly as recited in claim 2, wherein the first gas turbine engine component is a turbine vane or a blade outer air seal.

4. The seal assembly as recited in claim 1, wherein:
the main body extends between an inner periphery and an outer periphery; and
each abutment of the first set of abutments includes an abutment body extending axially between the main body and an abutment face that contacts the first side plate, and the abutment body extends circumferentially between opposed sidewalls that circumferentially bound respective pockets of the first set of pockets, the opposed sidewalls taper radially inwardly to join at an apex, and the apex is spaced apart from the inner periphery.

5. A seal assembly for a gas turbine engine comprising:
a first side plate and a backing plate that extend circumferentially about an assembly axis, wherein the backing plate includes a main body and a first set of abutments that extend outwardly from the main body to abut the first side plate, and a first set of pockets are established between adjacent abutments of the first set of abutments;
a first brush seal between the first side plate and the backing plate, wherein sections of the first brush seal received in respective pockets of the first set of pockets are dimensioned to join together to establish a first sealing relationship with a first gas turbine engine component;
a second side plate that extends circumferentially about the assembly axis;
a second brush seal between the second side plate and the backing plate;
wherein the backing plate includes a second set of abutments that extend outwardly from the main body to abut the second side plate, and a second set of pockets are established between adjacent abutments of the second set of abutments; and
wherein sections of the second brush seal received in respective pockets of the second set of pockets are dimensioned to join together to establish a second sealing relationship with a second gas turbine engine component.

6. The seal assembly as recited in claim 5, wherein the second side plate includes a plate body and an annular flange extending circumferentially about the assembly axis, the annular flange dimensioned to engage an outer periphery of the second gas turbine engine component.

7. The seal assembly as recited in claim 5, wherein one or more abutments of the first set of abutments is circumferentially aligned with a respective abutment of the second set of abutments to establish a set of direct load paths through the main body between the first side plate and the second side plate.

8. The assembly as recited in claim 7, wherein the first and second sets of abutments are non-uniformly distributed about the assembly axis.

9. The assembly as recited in claim 7, wherein the first and second brush seals extend radially inward from an inner periphery of the backing plate relative to the assembly axis to establish the first and second sealing relationships.

10. The assembly as recited in claim 9, wherein the first brush seal includes a first bristle pack welded to the first side plate and the backing plate and the second brush seal includes a second bristle pack welded to the second side plate and the backing plate to establish a unitary construction.

11. A gas turbine engine comprising:
a section including an array of blades rotatable about a longitudinal axis, an array of vanes adjacent to the array of blades, an array of blade outer air seals arranged circumferentially about the array of blades relative to the longitudinal axis, and a seal assembly; and
wherein the seal assembly comprises:
a first side plate and a backing plate that extends circumferentially about the longitudinal axis, wherein the backing plate includes a main body and a first set of abutments that extend outwardly from the main body to abut the first side plate;
a first brush seal between the first side plate and the backing plate, wherein the first brush seal includes sections received between adjacent abutments of the first set of abutments such that the adjacent abutments separate the sections from each other, and the sections of the first brush seal are dimensioned to join together outwardly of the first set of abutments to establish a first sealing relationship with the array of vanes or the array of blade outer air seals.

12. The gas turbine engine as recited in claim 11, wherein:
the seal assembly is dimensioned to span between the array of vanes and the array of blade outer air seals;
the seal assembly includes a second side plate and a second brush seal between the second side plate and the backing plate;
the backing plate includes a second set of abutments that extend outwardly from the main body to abut the second side plate; and
the second brush seal includes sections received between adjacent abutments of the second set of abutments, and the sections of the second brush seal are dimensioned to join together to establish a second sealing relationship with the array of vanes or the array of blade outer air seals.

13. The gas turbine engine as recited in claim 12, wherein:
the array of vanes and the array of blade outer air seals establish an axial gap relative to the longitudinal axis, the axial gap extending from a core flow path, and the seal assembly is dimensioned to span the axial gap; and
the first and second brush seals extend radially inward from an inner periphery of the backing plate to establish the first and second sealing relationships.

14. The gas turbine engine as recited in claim 11, wherein each of the vanes includes an airfoil section extending from a platform section that bounds a gas path, the platform section is arranged to establish the first sealing relationship with the first brush seal, and the platform section comprises a ceramic material.

15. The gas turbine engine as recited in claim 14, wherein each of the vanes includes a metallic spar member secured to a fairing, the fairing comprises a ceramic matrix composite material that establishes the airfoil section and the platform section, and the seal assembly is trapped between one or more of the spar members and one or more of the blade outer air seals.

16. A method of assembly for a gas turbine engine comprising:
    positioning a first brush seal between a first side plate and an annular backing plate, wherein the backing plate includes a main body and a first set of abutments that extend outwardly from the main body to abut the first side plate, and a first set of pockets are established between adjacent abutments of the first set of abutments;
    mechanically attaching the first brush seal to the first side plate and the backing plate to establish a seal assembly; and
    positioning the seal assembly such that sections of the first brush seal received in respective pockets of the first set of pockets are separated from each other, and the sections of the first brush seal join together outwardly of the first set of pockets to establish a first sealing relationship with a first gas turbine engine component.

17. The method as recited in claim 16, wherein a portion of the first gas turbine engine component that establishes the first sealing relationship comprises a ceramic matrix composite material.

18. The method as recited in claim 16, further comprising:
    positioning a second brush seal between a second side plate and the backing plate, wherein the backing plate includes a second set of abutments that extend outwardly from the main body to abut the second side plate, and a second set of pockets are established between adjacent abutments of the second set of abutments;
    mechanically attaching the second brush seal to the second side plate and the backing plate to establish the seal assembly; and
    wherein the step of positioning the seal assembly occurs such that sections of the second brush seal received in respective pockets of the second set of pockets join together to establish a second sealing relationship with a second gas turbine engine component.

19. The method as recited in claim 18, wherein the steps of mechanically attaching the first brush seal and mechanically attaching the second brush seal include welding the first and second brush seals to the backing plate and to respective ones of the first and second side plates to establish a unitary construction prior to the step of positioning the seal assembly.

20. The method as recited in claim 18, wherein each abutment of the first set of abutments is circumferentially aligned with a respective abutment of the second set of abutments to establish a set of direct load paths through the main body between the first side plate and the second side plate.

* * * * *